United States Patent
Dohrmann et al.

[11] Patent Number: 6,027,105
[45] Date of Patent: Feb. 22, 2000

[54] IMPACT DAMPER

[75] Inventors: Wolfgang Dohrmann, Eitorf; Metin Ayyildiz, Köln, both of Germany

[73] Assignee: Mannesmann Boge GmbH, Bonn, Germany

[21] Appl. No.: 09/107,669

[22] Filed: Jun. 30, 1998

[30] Foreign Application Priority Data

Jul. 1, 1997 [DE] Germany .................. 197 27 931

[51] Int. Cl.[7] ................... F16F 9/16; B60R 19/02
[52] U.S. Cl. .................. 267/139; 188/297; 188/371; 188/374; 267/64.15; 267/116; 293/133
[58] Field of Search ................. 267/139, 140, 267/116, 64.15, 64.26, 120; 188/371–377, 269, 322.19, 297; 293/133, 134, 136, 132; 213/222, 223

[56] References Cited

U.S. PATENT DOCUMENTS

| | | |
|---|---|---|
| 3,757,900 | 9/1973 | Gischlar . |
| 3,993,294 | 11/1976 | Wössner et al. .............. 267/116 |
| 4,022,451 | 5/1977 | Voigt ........................... 267/139 |
| 4,181,198 | 1/1980 | Lindberg ..................... 293/133 |
| 4,641,872 | 2/1987 | Löhr et al. ................... 293/133 |
| 4,915,363 | 4/1990 | Prozeller et al. ............. 267/64.15 |
| 4,934,749 | 6/1990 | Folarin ........................ 293/134 |
| 4,988,081 | 1/1991 | Dohrmann .................... 267/139 |
| 5,064,030 | 11/1991 | Wössner ....................... 188/297 |
| 5,174,421 | 12/1992 | Rink et al. ................... 188/372 |
| 5,443,146 | 8/1995 | Ayyildiz et al. ............. 188/371 |
| 5,884,959 | 3/1999 | Hillan .......................... 293/136 |

*Primary Examiner*—Douglas C. Butler
*Attorney, Agent, or Firm*—Cohen, Pontani, Lieberman & Pavane

[57] ABSTRACT

An impact damper includes two tubes which are slidable one in the other for braking a vehicle impact against an obstacle by hydraulic damping forces and pneumatic spring forces. The inner tube is closed off by a bottom. A gas chamber containing a high pressure gas cushion is arranged adjacent to the bottom and bounded by a separating piston that is guided sealingly and displaceably in the inner tube. A first fluid chamber is arranged between the separating piston and a partition fixed in the inner tube and provided with choke openings. A second fluid chamber is formed by the outer tube and connected to the first fluid chamber via the partition. The outer tube has a tapering region directed away from the partition, and a deformation element dividing the second fluid chamber into two part chambers.

10 Claims, 2 Drawing Sheets

IMPACT DAMPER

BACKGROUND OF THE INVENTION

1. Field of the Invention

The invention relates to an impact damper for a vehicle having two tubes which are slidable one in the other. The impact damper brakes a vehicle impacting against an obstacle by hydraulic damping forces and pneumatic spring forces. The impact damper includes an inner tube closed off by a bottom, a gas chamber adjacent to the bottom of the inner tube and containing a high-pressure gas cushion, a separating piston guided sealingly and displaceably in the inner tube, a first fluid chamber in the inner tube separated from the gas chamber by the separating piston, a partition fixed in the inner tube and provided with choke openings, and a second fluid chamber formed by an outer tube and connected to the first fluid chamber via the partition.

2. Description of the Related Art

A prior art hydropneumatic impact damper for a vehicle is known from DE 24 04 706, in which an inner tube is pushed into an outer tube in the event of a collision. The inner tube has a gas chamber which contains a gas cushion and is separated in a sealed manner in relation to a first fluid chamber by a separating piston. The first fluid chamber is in turn delimited at the end of the inner tube by a partition which has a choke bore so that such that fluid in the first fluid chamber in the inner tube can flow toward a second fluid chamber which is formed by the outer tube therethrough.

The impact damper has connection elements on the inner tube and on the outer tube for the vehicle body and a vehicle fender.

In the event of a collision, the inner tube moves into the outer tube and displaces damping fluid out of the second fluid chamber through the choke opening of the partition into the first fluid chamber of the inner tube, a damping force being generated. The increasing volume of the first fluid chamber is compensated by the separating piston being displaced. Purely hydraulic damping takes place, which, however, is suitable only up to an impact range of 4–8 km/h. Above this energy absorption threshold, the fender and/or the body parts adjacent to the impact damper will be permanently deformed.

Another prior art impact damper is known from DE 34 19 165 which has, in addition to hydraulic damping, a deformation damper in the form of a folding tube. As soon as the energy absorption threshold for the hydraulic damping is exceeded, deformation of the deformation tube occurs up to an energy absorption threshold of roughly 15 km/h. This involves a serious disadvantage because, after a collision, a permanent change in length of the impact damper must be accepted. Moreover, an impact damper of this type of construction has the disadvantage that all the construction spaces, that is to say the first fluid chamber, second fluid chamber and the gas chamber, are arranged in a row, to which the construction space for the deformation tube is in turn adjacent.

Precisely the same disadvantages are present in another prior art impact damper known from EP-A 0.473.955. In this prior art device, a deformation piston is displaced inside a deformation tube, the deformation piston being connected to the hydraulic damping arrangement via a piston rod. In addition to the above-mentioned disadvantages, the piston rod between the hydraulic damping arrangement and the deformation piston involves the disadvantage that the piston rod has elastic properties so that the damping force as a function of the travel has a maximum which can be defined only with difficulty so that the risk is not excluded that the vehicle body will deform before the deformation body on the impact damper comes into play.

An impact damper with a deformation body is also known from DE 44 03 127 A1, in which a partition fixed in the inner tube is provided. Above a given energy absorption threshold, the partition is displaced toward the gas chamber from its original mounting position, with deformation of the inner tube.

SUMMARY OF THE INVENTION

The object of the present invention is to provide an impact damper which overcomes the disadvantages known from the above-mentioned state of the art by very simple means and with the objective of minimum construction space.

According to the invention, the object is achieved by an impact damper which includes an inner tube and an outer tube. The inner tube has an open end that is slidably inserted into the outer tube such that the inner tube moves into and out of the outer tube. The other end of the inner tube is closed by a bottom. The area in the inner tube has a gas chamber adjacent the bottom and a first fluid chamber. The first fluid chamber is separated from the gas chamber by a separating piston which is sealably movably mounted in the inner tube. A partition is mounted at the open end of the inner tube having a choke hole. The outer tube has a second fluid chamber in communication with the first fluid chamber through the choke hole. The outer tube of the impact damper has a tapered region directed away from the partition between the inner and outer tube and a deformation element which divides the second fluid chamber in the outer tube into two parts.

In this connection, it is advantageous that, under a corresponding load, the deformation element is pushed into the tapering region of the second fluid chamber. The mode of operation of the impact damper is such that, during a normal impact of the vehicle up to a maximum of 8 km/h, a fluid exchange occurs between the first and second fluid chambers via the choke opening so that the gas chamber is compressed by the separating piston which moves toward the bottom of the inner tube. At this stage, the movement made by the impact damper is reversible. That is to say, the gas chamber expands after an impact back to its original position.

If an impact of the vehicle occurs at up to 15 km/h, the choke is blocked as a result of the rapid entry of the inner tube into the outer tube, so that no fluid flows from the second fluid chamber into the first. In this situation, the deformation element is pushed at least partly into the tapered region. The fluid of the second fluid chamber, which cannot escape through the choke opening, exerts a pressure on the deformation element. Subsequently, the gas chamber expands more than during the impact at up to 8 km/h so that the impact damper returns into its original position after this impact also. It is necessary to remove the impact damper only when the deformation element is pushed to the end of the tapered region so that no further absorption is possible.

According to a further embodiment, the tapered region includes a region of smaller internal diameter. The tapered region may also include a cylindrical section of smaller internal diameter than the remainder of the outer tube.

Other embodiments include a conical tapering region and/or a tapering region having a continuously decreasing cross-section.

In yet another embodiment, the deformation element comprises a piston element sealed in the outer tube. In this connection, the piston element advantageously has a centering projection corresponding to the tapered region.

In a further embodiment, the piston element comprises cutouts on its outer surface which extend axially over only a part of the entire outer surface.

According to a further embodiment, the greater external diameter of the piston element is reduced to the cross-section of the tapered region under the urging of deformation forces resulting from an impact of the vehicle.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
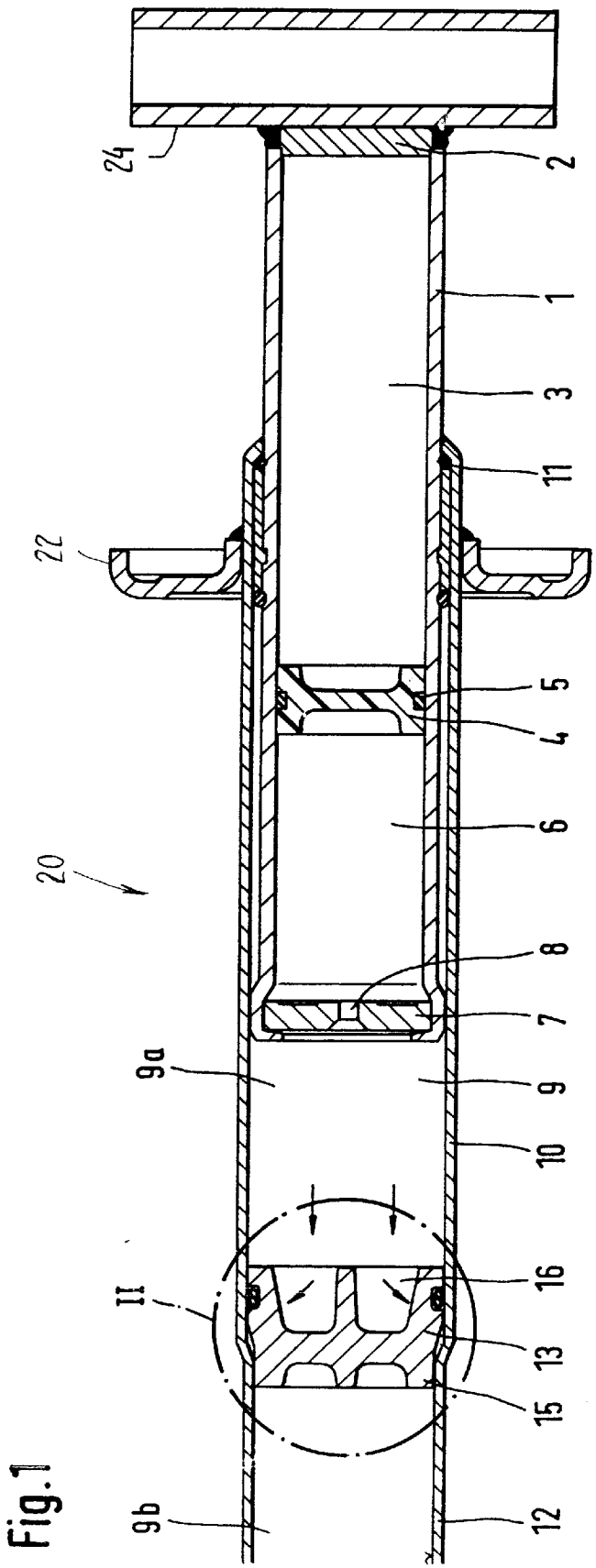
FIG. 1 is a sectional view of an impact damper according to an embodiment of the present invention.

Referring to FIG. 1, an impact damper 20 according to the present invention is connected directly to a vehicle body by a component 22 fixed to a cylinder, or outer tube 10, while a connecting piece 24 mounted at an end of a piston rod, or inner tube 1 is fastened to a fender of the vehicle. Each fender of a vehicle is connected to the vehicle body with two of these impact dampers 20. In the event of a gentle impact of the vehicle against an obstacle, that is to say at relatively low impact speeds of the vehicle, the energy of the impact is absorbed by the impact dampers 20 and damage to the vehicle is prevented.

The impact damper 20 comprises the outer tube 10 which includes the component 22 for fastening the impact damper to the vehicle body and the inner tube 1 which is inserted into the outer tube 10. The outer tube 10 and inner tube 1 are sealed relative to one another via a sealing ring 11. In the inner tube 1, a separating piston 4 separates a gas chamber 3, which is filled with compressed gas, from a first fluid chamber 6. The first fluid chamber 6 is connected to a second fluid chamber 9 in the outer tube 10 through a choke opening 8 situated in a partition 7. The choke opening 8 acts as a damping arrangement. The partition 7 is fastened to the end of inner tube 1 which is inserted into outer tube 10 and is fastened to the end of the inner tube 1 by flanging the end. The first fluid chamber 6 and the second fluid chamber 9 are filled with fluid. During normal circumstances, when the vehicle is not involved in a collision or impact, the separating piston 4 is automatically resides at a position at which the pressure in the pressurized gas chamber 3 equals the pressure first fluid chamber 6 and second fluid chamber 9.

During a collision of the vehicle equipped with the impact damper 20 at a speed of up to roughly 8 km/h, the inner tube 1 is pushed into the outer tube 10. At the same time, fluid is forced out of the second fluid chamber 9 in the outer tube 10 into the first fluid chamber 6 of the inner tube 1 with the choke opening 8 in partition 7 acting as a damping arrangement. Instead of this damping arrangement comprising only the choke opening, additional damping valves or only damping valves may also be used as the damping arrangement. This fluid that is forced through the choke opening 8 in the partition 7 increases a volume of the first fluid chamber 6 and causes an axial displacement of the separating piston 4. The axial displacement of the separating piston 4 causes a decrease in volume of the gas chamber 3 filled with compressed gas and thus an increase in pressure of the gas chamber 3. The reaction force of the hydropneumatic impact damper 20 consequently comprises the damping force generated when the fluid flow through the damping arrangement is choked and the pneumatic spring force generated as a result of the increase in pressure in the gas chamber 3. This description relates to a collision speed or absorption threshold of up to 8 km/h.

At collision speeds above 8 km/h and up to 15 km/h, the inner tube 1 is once again driven into the outer tube 10, but the fluid in the second fluid chamber 9 does not now move through the choke opening 8 of the partition 7. The choke opening 8 is blocked because the inner tube 1 is driven in rapidly. The increased pressure in the fluid in the second fluid chamber 9 then moves a deformation element 13 into a tapered region 12 of the outer tube 10. Because the internal diameter 14 of the tapered region 12 of the outer tube 10 is less than the remainder of the outer tube 10, the deformation element 13 is pressed into the tapered region. The volume of the second fluid chamber 9 consequently increases.

After the pressure in the second fluid chamber 9 has been correspondingly reduced, the choke opening 8 then becomes active again and further pressure reduction occurs in the manner described previously. Even if the deformation element 13 is fully pressed into the tapered region 12, the impact damper 20 will return to its starting position again after the expansion of the compressed gas in the gas chamber 3. This means that the impact damper 20 remains operational in collision speeds of up to 15 km/h. Only when, after a number of collisions, the deformation element 13 has arrived at the end region of the outer tube 10 does maintenance, overhaul, or replacement of the impact damper 20 become necessary.

Figure 2:
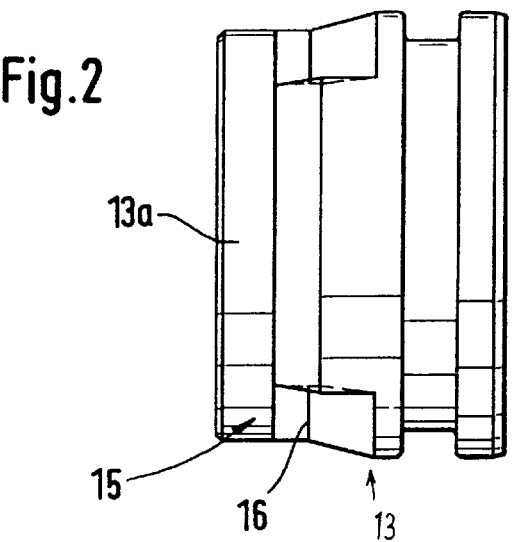
FIG. 2 is a side view showing a deformation element of the embodiment of the present invention shown in FIG. 1.

FIG. 2 shows the deformation element 13. The form of a piston element 13a is selected to enable perfect guidance of the deformation element 13 into the tapered region 12 via the centering projection 15 of the piston element 13a. It is also possible to achieve a suitable pressure surface via cutouts 16 which extend only partly over the axial length of the piston element 13a. By means of such a contour, a uniform pressure increase is achieved while the pressure is exerted from the second fluid chamber 9 toward the piston element 13a.

Figure 3:
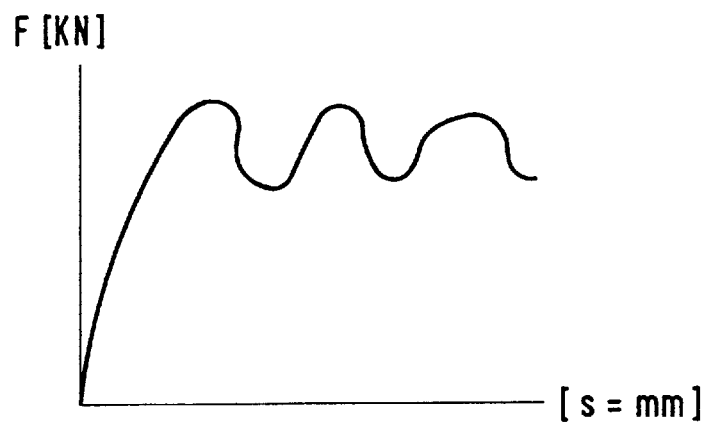
FIG. 3 shows a force/travel characteristic curve of a prior art impact damper.

FIG. 3 shows a characteristic force/travel curve of an impact damper according to a prior art impact damper, in which use is made of a deformation tube with a predetermined buckling point. In this case, considered over the travel, a non-uniform force is produced.

Figure 4:
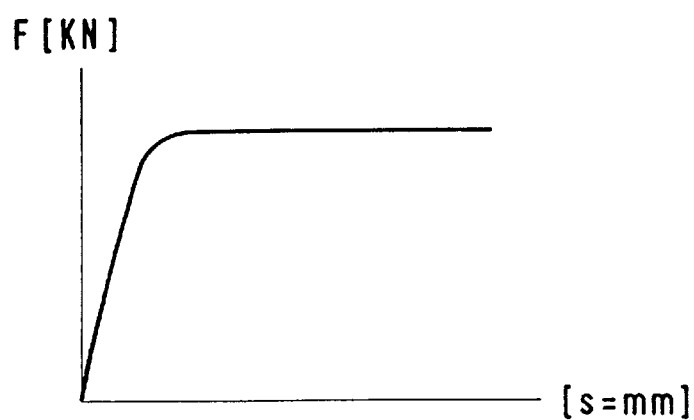
FIG. 4 shows a force/travel characteristic curve of the embodiment of the present invention illustrated in FIG. 1.

FIG. 4 shows on the other hand a force/travel curve for the impact damper according to the invention and shown in FIG. 1, in which, after a corresponding increase in force, a subsequent uniform force profile is achieved during reduction of the energy.

The invention is not limited by the embodiments described above which are presented as examples only but can be modified in various ways within the scope of protection defined by the appended patent claims.

We claim:

1. An impact damper for braking a vehicle impact against an obstacle, comprising:

an outer tube having a first end and a second end and a tapering region proximate said second end directed away from said first end;

an inner tube including a closed end having a bottom and an open end, said open end slidably inserted into said first end of said outer tube;

a separating piston sealingly and displaceably mounted in said inner tube;

a gas chamber in said inner tube between said bottom and said separating piston and comprising a high-pressure gas cushion;

a partition connected proximate said open end of said inner tube and comprising a damping device;

a first fluid chamber in said inner tube arranged between said partition and said separating piston;

a second fluid chamber in said outer tube, wherein said damping device is operatively arranged for permitting a flow between said first fluid chamber and said second fluid chamber when said inner tube moves into in said outer tube in response to the vehicle impact when the collision speed of the vehicle impact is not greater than a predetermined limit; and a deformation element dividing said second fluid chamber into two second chamber parts and operatively arranged so that when a collision speed of the vehicle impact exceeds the predetermined limit, the damping element is blocked and a movement of said inner tube into said outer tube forces said deformation element into said tapering region and causes a deformation of said deformation element in said tapering region.

2. The impact damper of claim 1, wherein said tapering region comprises a region of smaller internal diameter.

3. The impact damper of claim 2, wherein the region of smaller internal diameter comprises a cylindrical design.

4. The impact damper of claim 1, wherein said tapering region comprises a conical form.

5. The impact damper of claim 1, wherein said tapering region comprises a continuously decreasing cross section toward said second end.

6. The impact damper of claim 1, wherein said deformation element comprises a piston element sealed in said outer tube.

7. The impact damper of claim 6, wherein said piston element comprises a centering projection corresponding to said tapered region.

8. The impact damper of claim 6, wherein said piston element comprises an outer surface having cutouts which extend less than the entire axial width of said outer surface.

9. The impact damper of claim 6, wherein said piston element comprises a greater external diameter that is compressible to a cross section of said tapered region in response to deformation forces.

10. The impact damper of claim 1, wherein said damping device comprises one of a choked opening and a damping valve.

* * * * *